(12) United States Patent
Park et al.

(10) Patent No.: US 10,079,632 B2
(45) Date of Patent: Sep. 18, 2018

(54) METHOD FOR FEEDING BACK CHANNEL QUALITY INDICATOR IN WIRELESS COMMUNICATION SYSTEM AND APPARATUS THEREFOR

(71) Applicant: LG Electronics Inc., Seoul (KR)

(72) Inventors: Jonghyun Park, Seoul (KR); Yunjung Yi, Seoul (KR); Seungmin Lee, Seoul (KR); Bonghoe Kim, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 150 days.

(21) Appl. No.: 14/917,498

(22) PCT Filed: Dec. 29, 2014

(86) PCT No.: PCT/KR2014/012967
§ 371 (c)(1),
(2) Date: Mar. 8, 2016

(87) PCT Pub. No.: WO2015/099511
PCT Pub. Date: Jul. 2, 2015

(65) Prior Publication Data
US 2016/0218789 A1 Jul. 28, 2016

Related U.S. Application Data

(60) Provisional application No. 61/921,519, filed on Dec. 29, 2013.

(51) Int. Cl.
*H04W 72/04* (2009.01)
*H04B 7/06* (2006.01)
(Continued)

(52) U.S. Cl.
CPC ............ *H04B 7/0632* (2013.01); *H04J 11/00* (2013.01); *H04L 1/0001* (2013.01);
(Continued)

(58) Field of Classification Search
CPC ...... H04B 7/0632; H04J 11/00; H04L 1/0001; H04L 1/0003; H04L 1/0016;
(Continued)

(56) References Cited

U.S. PATENT DOCUMENTS 8,259,651 B2 * 9/2012 Zhang .................. H04L 1/0026
370/328
2012/0320783 A1 12/2012 Wu et al.
(Continued)

FOREIGN PATENT DOCUMENTS

CN 102612056 A 7/2012
CN 102882575 A 1/2013
(Continued)

OTHER PUBLICATIONS

ETSI TS 136 213 V11.4.0 (Oct. 2013), "LTE; Evolved Universal Terrestrial Radio Access (E-UTRA); Physical layer procedures (3GPP TS 36.213 version 11.4.0 Release 11)", XP055329377.
(Continued)

*Primary Examiner* — Asad Nawaz
*Assistant Examiner* — Zhaohui Yang
(74) *Attorney, Agent, or Firm* — Dentons US LLP

(57) ABSTRACT

In this application, a method for a terminal reporting to a base station a channel quality indicator (CQI) in a wireless communication system is disclosed. More specifically, the method comprises the steps of: calculating a precoding matrix index and a rank indicator; and selecting and reporting the CQI index from one of a first CQI index table and a second CQI index table under the assumption that the precoding matrix index and the rank indicator are applied, wherein the first CQI index table and the second CQI index table indicate a modulation order and a coding rate indicated by the CQI index, and the second CQI index table supports a higher modulation order than the first CQI index table.

4 Claims, 7 Drawing Sheets

(51) Int. Cl.
*H04J 11/00* (2006.01)
*H04L 1/18* (2006.01)
*H04L 12/741* (2013.01)
*H04L 1/00* (2006.01)

(52) U.S. Cl.
CPC .......... *H04L 1/0003* (2013.01); *H04L 1/0016* (2013.01); *H04L 1/0026* (2013.01); *H04L 1/1812* (2013.01); *H04L 45/745* (2013.01); *H04W 72/042* (2013.01)

(58) Field of Classification Search
CPC ... H04L 1/0026; H04L 1/1812; H04L 45/745; H04W 72/042
See application file for complete search history.

(56) References Cited

U.S. PATENT DOCUMENTS

| | | | | |
|---|---|---|---|---|
| 2015/0036590 A1* | 2/2015 | Lahetkangas | ......... | H04L 1/0003 370/328 |
| 2015/0358111 A1* | 12/2015 | Marinier | ............... | H04L 1/0003 370/329 |
| 2015/0381310 A1* | 12/2015 | Hammarwall | ........ | H04L 1/0003 370/329 |
| 2017/0279586 A1* | 9/2017 | Zhang | ............... | H04W 72/0413 |

FOREIGN PATENT DOCUMENTS

| | | |
|---|---|---|
| CN | 103326815 A | 9/2013 |
| EP | 3089508 A1 | 2/2016 |
| KR | 10-2008-0045137 A | 5/2008 |
| KR | 10-2010-0126278 A | 12/2010 |
| KR | 10-2012-0127391 A | 11/2012 |
| WO | 2013123961 A1 | 8/2013 |

OTHER PUBLICATIONS

Panasonic: "MCS Table Adaptation for Low Power ABS", 3GPP TSG-RAN WG1 Meeting 70bis, R1-124232, Oct. 3-12, 2012, XP050662139.

Huawei, et al.: "Standard impacts of 256QAM", R1-134061, 3GPP TSG RAN WG1 Meeting #74bis, Guangzhou, China, Oct. 7-11, 2013.

* cited by examiner (a) Control-Plane Protocol Stack (b) User-Plane Protocol Stack

METHOD FOR FEEDING BACK CHANNEL QUALITY INDICATOR IN WIRELESS COMMUNICATION SYSTEM AND APPARATUS THEREFOR

This application is a 35 USC § 371 National Stage entry of International Application No. PCT/KR2014/012967 filed on Dec. 29, 2014, and claims priority to U.S. Provisional Application No. 61/921,519 filed on Dec. 29, 2013, all of which are hereby incorporated by reference in their entireties as if fully set forth herein.

TECHNICAL FIELD

The present invention relates to a wireless communication system, and more particularly, to a method for feeding back a channel quality indicator in a wireless communication system and apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE OF THE INVENTION

Technical Task

Based on the above-described discussion, a method for feeding back a channel quality indicator in a wireless communication system and apparatus therefor are proposed in the present invention.

Technical Solutions

In a $1^{st}$ technical aspect of the present invention, provided herein is a method of reporting a CQI (channel quality indicator), which is reported by a user equipment to a base station in a wireless communication system, including the steps of calculating a precoding matrix index and a rank indicator and reporting a CQI index by selecting the CQI index from one index table of a $1^{st}$ CQI index table and a $2^{nd}$ CQI index table on an assumption that the precoding matrix index and the rank indicator are applied. The $1^{st}$ CQI index table and the $2^{nd}$ CQI index table indicate a modulation order and a coding rate indicated by the CQI index and the $2^{nd}$ CQI index table supports a modulation order higher than that of the $1^{st}$ CQI index table.

In this case, the method includes the step of configuring parameters for defining a $1^{st}$ CQI reporting instance and parameters for defining a $2^{nd}$ CQI reporting instance through a high layer. The one index table is determined according to whether a time of reporting the CQI index is included in the $1^{st}$ CQI reporting instance or the $2^{nd}$ CQI reporting instance.

Particularly, the parameters includes a CQI reporting period. It is preferable that a CQI reporting period of the $2^{nd}$ CQI reporting instance is an integer multiple of a CQI reporting period of the $1^{st}$ CQI reporting instance. In addition, the $1^{st}$ CQI reporting instance corresponds to the $1^{st}$ CQI index table and the $2^{nd}$ CQI reporting instance corresponds to the $2^{nd}$ CQI index table.

Alternatively, the method may include the step of receiving triggering information of channel state information reporting from the base station. In this case, the one index table is determined according to a type of a subframe in which the triggering information is received or a type of downlink control information in which the triggering information is included.

In a $2^{nd}$ technical aspect of the present invention, provided herein is a user equipment in a wireless communication system, including a wireless communication module for transceiving signals with a base station and a processor for processing the signals. The processor is configured to calculate a precoding matrix index and a rank indicator based on a signal received from the base station and to control the wireless communication module to report a CQI (channel quality indicator) index by selecting the CQI index from one index table of a $1^{st}$ CQI index table and a $2^{nd}$ CQI index table on an assumption that the precoding matrix index and the rank indicator are applied. The $1^{st}$ CQI index table and the $2^{nd}$ CQI index table indicate a modulation order and a coding rate indicated by the CQI index and the $2^{nd}$ CQI index table supports a modulation order higher than that of the $1^{st}$ CQI index table.

In this case, the processor is configured to configure parameters for defining a $1^{st}$ CQI reporting instance and parameters for defining a $2^{nd}$ CQI reporting instance through a high layer. The one index table is determined according to whether a time of reporting the CQI index is included in the $1^{st}$ CQI reporting instance or the $2^{nd}$ CQI reporting instance. In this case, the parameters include a CQI reporting period and a CQI reporting period of the $2^{nd}$ CQI reporting instance is an integer multiple of a CQI reporting period of the $1^{st}$ CQI reporting instance.

Alternatively, the processor may be configured to control the wireless communication module to receive triggering information of channel state information reporting from the base station. In this case, the one index table is determined according to a type of a subframe in which the triggering information is received or a type of downlink control information in which the triggering information is included.

Advantageous Effects

According to an embodiment of the present invention, a user equipment can more efficiently report a channel quality indicator in a wireless communication system.

It will be appreciated by persons skilled in the art that that the effects that can be achieved through the present invention are not limited to what has been particularly described hereinabove and other advantages of the present invention will be more clearly understood from the following detailed description.

BEST MODE FOR INVENTION

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

Figure 1:
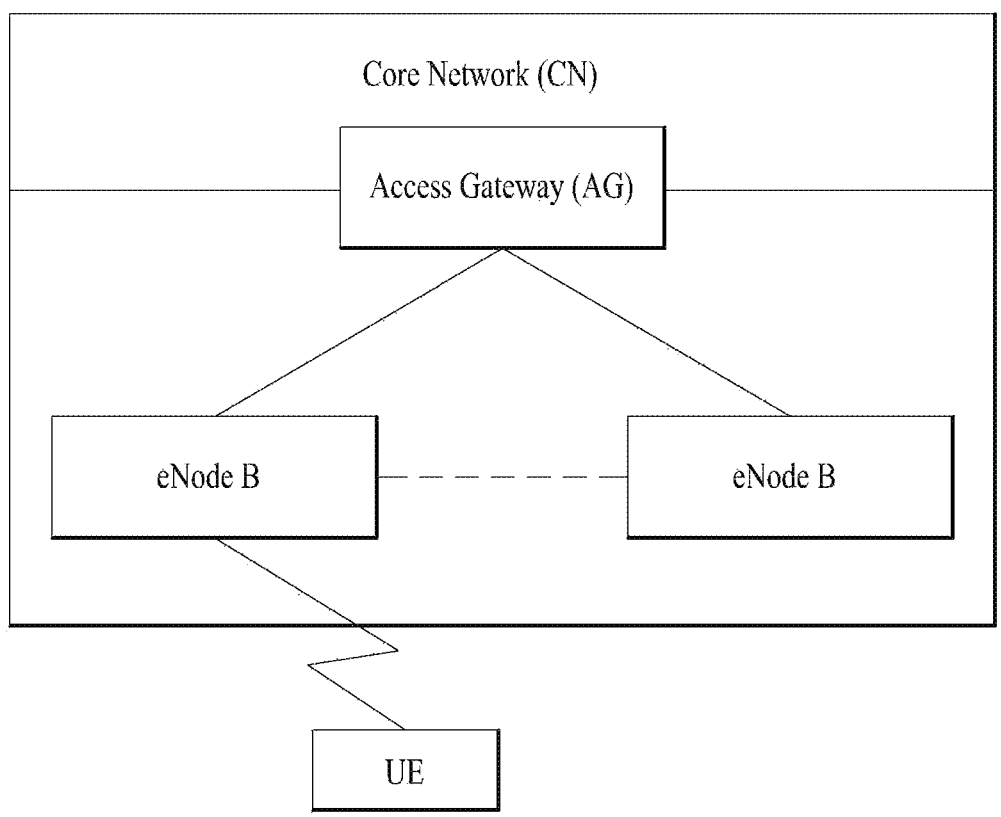
FIG. 1 is a diagram schematically illustrating a network structure of an E-UMTS as an exemplary radio communication system.
Figure 2:
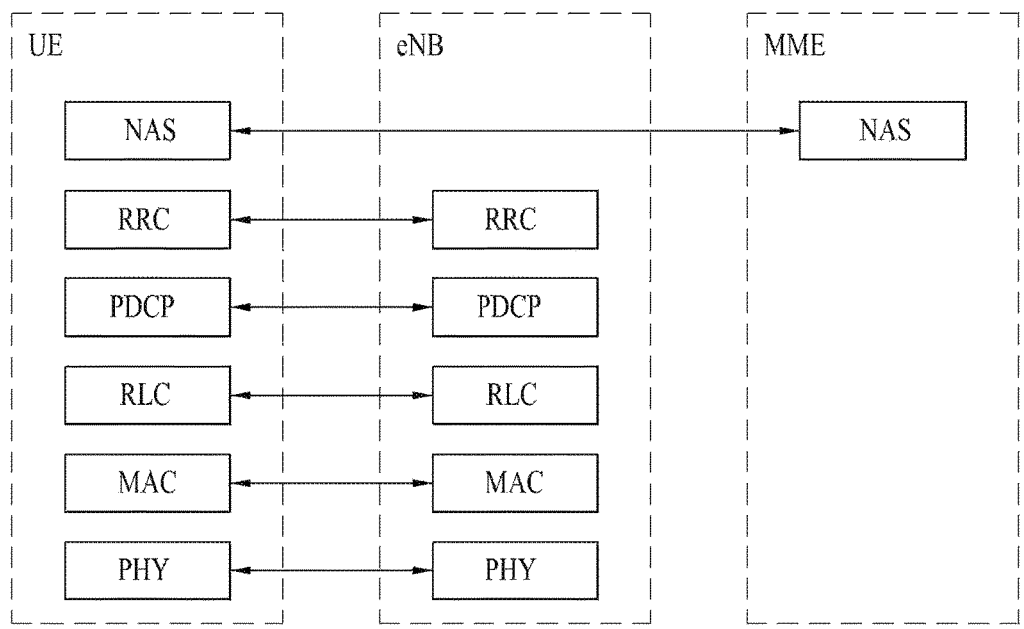
FIG. 2 is a diagram illustrating structures of a control plane and a user plane of a radio interface protocol between a UE and an E-UTRAN based on the 3GPP radio access network specification.
Figure 2:
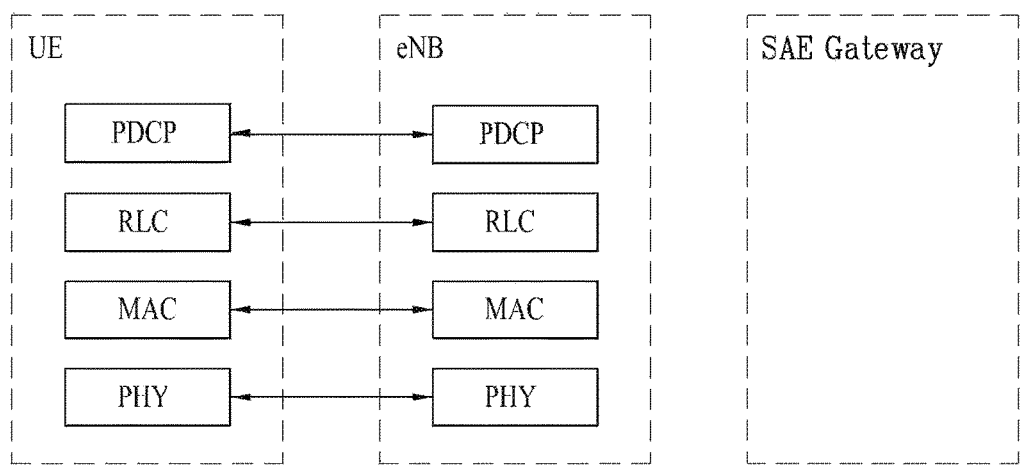

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
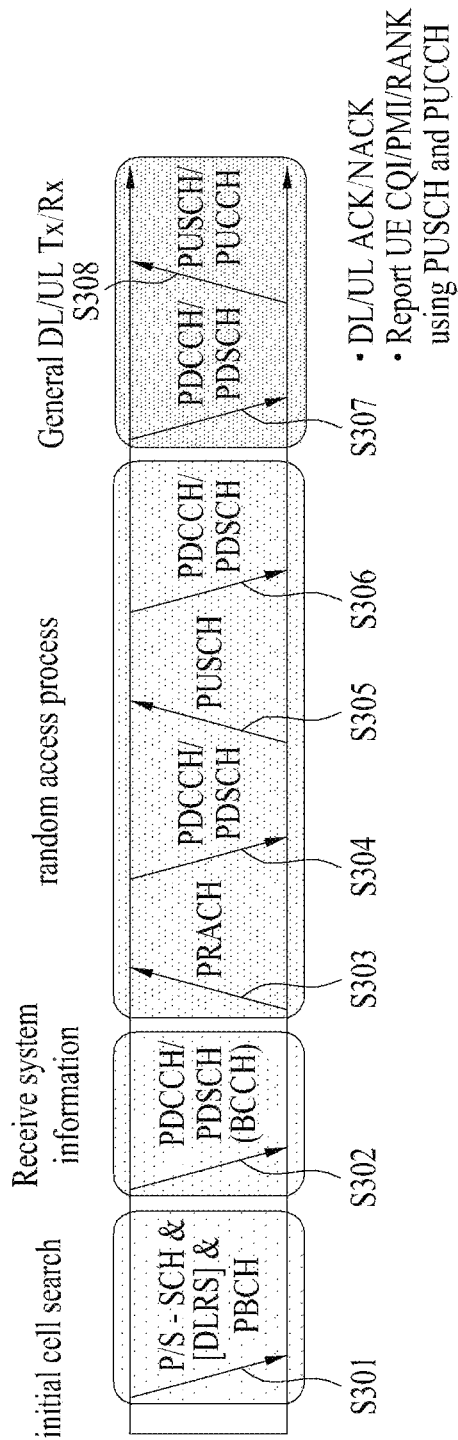
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
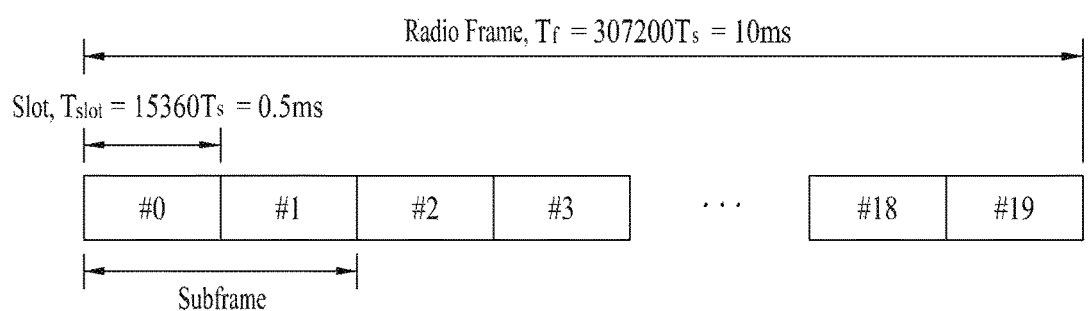
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms ($327200 \times T_s$) and includes 10 equal-sized subframes. Each of the subframes has a length of 1 ms and includes two slots. Each slot has a length of 0.5 ms ($15360 \ T_s$). In this case, Ts denotes a sampling time represented by $T_s=1/(15 \text{ kHz} \times 2048)=3.2552 \times 10^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
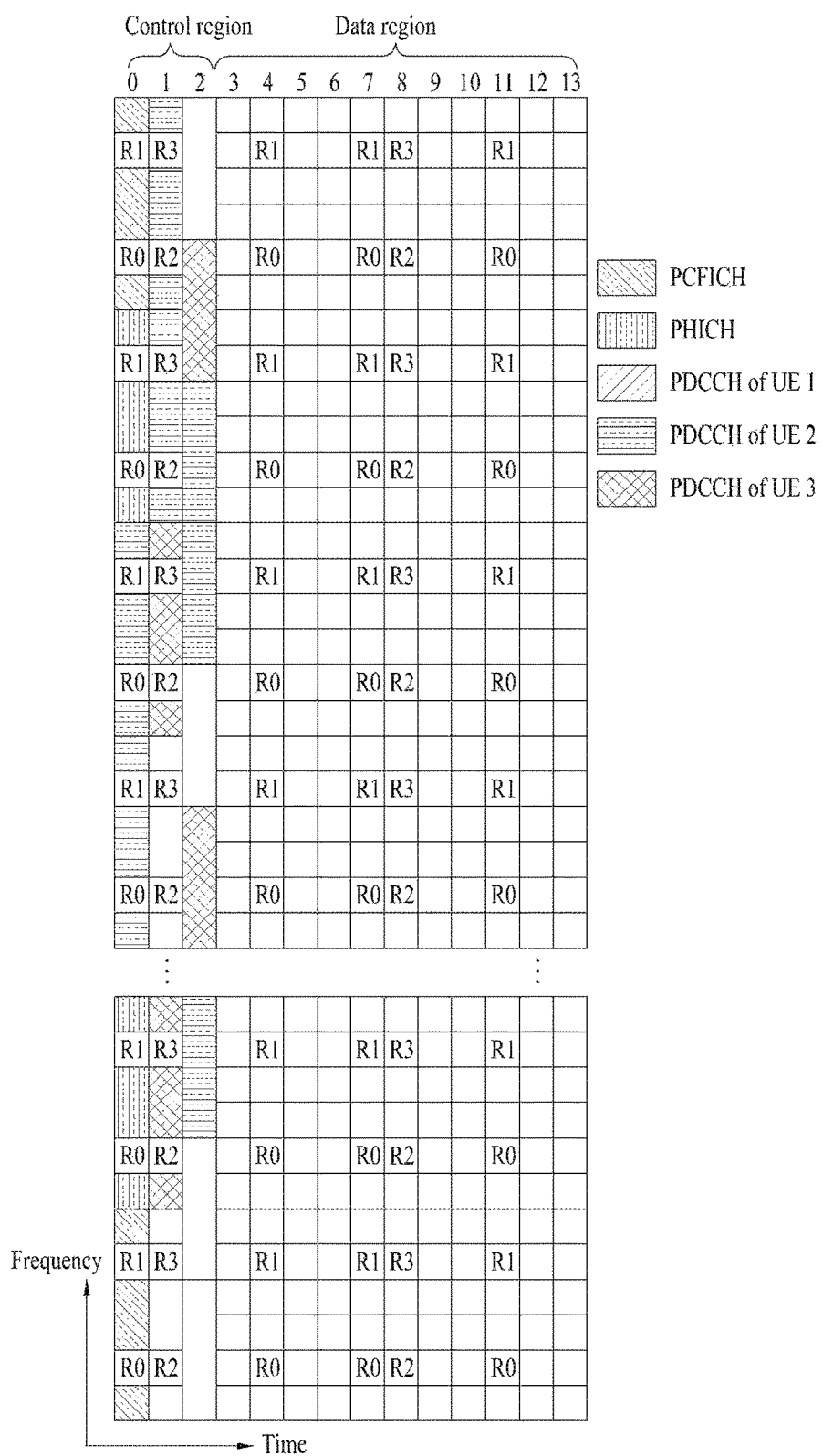
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
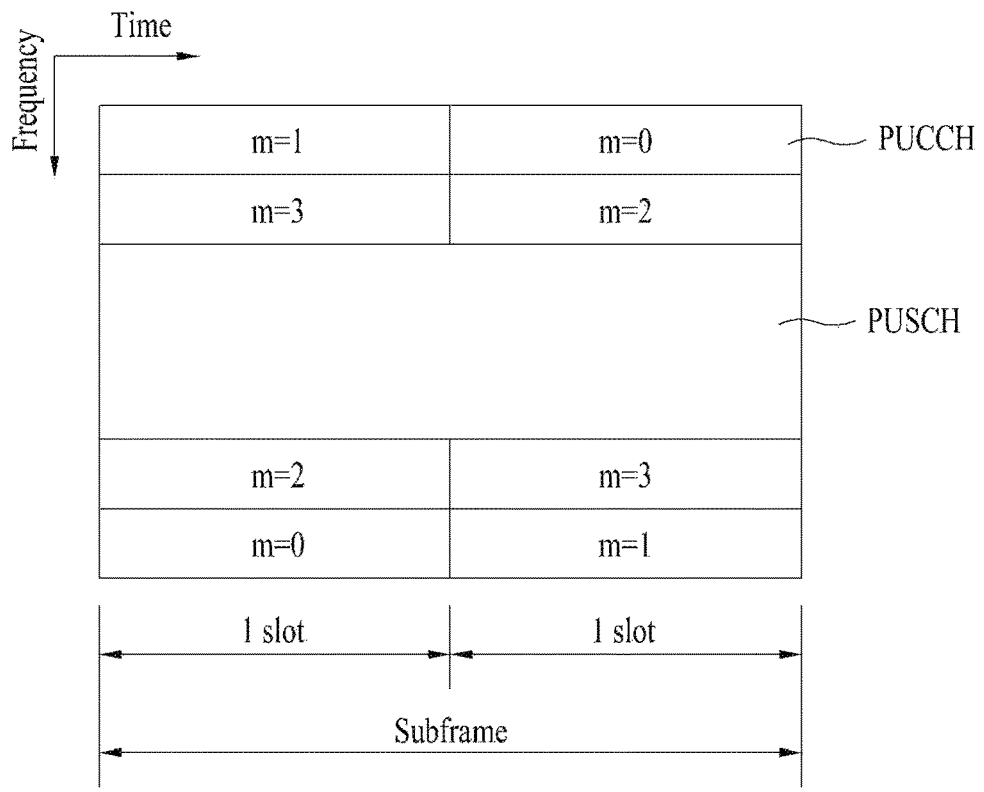
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

Figure 7:
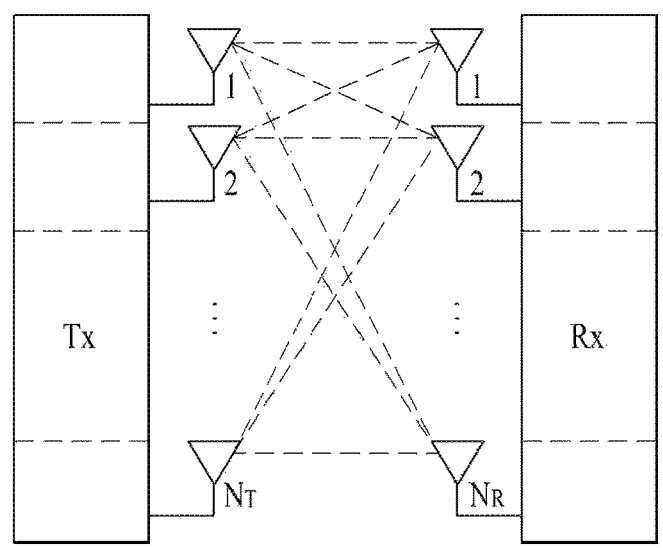
FIG. 7 is a diagram illustrating a configuration of a general MIMO communication system.

FIG. 7 illustrates the configuration of a typical MIMO communication system.

A transmitter has $N_T$ transmit (Tx) antennas and a receiver has $N_R$ receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present as illustrated in FIG. 7. Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

Individual pieces of the transmission information $s_1, s_2, \ldots, s_{N_T}$ may have different transmit powers. If the individual transmit powers are denoted by $P_1, P_2, \ldots, P_{N_T}$, respectively, then the transmission power-controlled transmission information may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, NT transmission signals $x_1, x_2, \ldots, x_{N_T}$ to be actually transmitted may be configured by multiplying the transmission power-controlled information vector $\hat{S}$ by a weight matrix W. The weight matrix W functions to appropriately distribute the transmission information to individual antennas according to transmission channel states, etc. The transmission signals $x_1, x_2, \ldots, x_{N_T}$ are represented as a vector X, which may be determined by Equation 5. Here, $w_{ij}$ denotes a weight of an i-th Tx antenna and a j-th piece of information. W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = $$ [Equation 5]

$$W\hat{s} = WPs$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R)$$ [Equation 6]

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R)$$ [Equation 7]

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

It is expected that the next-generation mobile communication standard, LTE-A, will support coordinated multi-point (CoMP) transmission in order to increase data transmission rate, compared to the legacy LTE standard. CoMP refers to transmission of data to a UE through cooperation among two or more eNBs or cells in order to increase communication performance between a UE located in a shadow area and an eNB (a cell or sector).

CoMP transmission schemes may be classified into CoMP-Joint processing (CoMP-JP) called cooperative MIMO characterized by data sharing, and CoMP-coordinated scheduling/beamforming (CoMP-CS/CB).

In DL CoMP-JP, a UE may instantaneously receive data simultaneously from eNBs that perform CoMP transmission and may combine the received signals, thereby increasing reception performance (joint transmission (JT)). In addition, one of the eNBs participating in the CoMP transmission may transmit data to the UE at a specific time point (dynamic point selection (DPS)).

In contrast, in downlink CoMP-CS/CB, a UE may receive data instantaneously from one eNB, that is, a serving eNB by beamforming.

In UL CoMP-JP, eNBs may receive a PUSCH signal from a UE at the same time (joint reception (JR)). In contrast, in UL CoMP-CS/CB, only one eNB receives a PUSCH from a UE. Here, cooperative cells (or eNBs) may make a decision as to whether to use CoMP-CS/CB.

Hereinbelow, a description of channel state information (CSI) reporting will be given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI in order to obtain multiplexing gain of MIMO antennas. To acquire CSI from the UE, the eNB transmits RSs to the UE and commands the UE to feed back CSI measured based on the RSs through a PUCCH or a PUSCH.

CSI is divided into three types of information: an RI, a PMI, and a CQI. First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI. This is expressed as a combination of a modulation order and a coding rate corresponding to the relevant CQI in the LTE system. For reference, in the current 3GPP standard document, a CQI index, a modulation order and a coding rate corresponding to the CQI index, and the like are defined as shown in Table 1 below. The CQI index is a value between 0 and 15 and is indicated by total 4 bits of a bit field.

TABLE 1

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

An advanced system such as an LTE-A system considers additional multi-user diversity through multi-user MIMO (MU-MIMO). Due to interference between UEs multiplexed in an antenna domain in MU-MIMO, the accuracy of CSI may significantly affect interference with other multiplexed UEs as well as a UE that reports the CSI. Accordingly, more accurate CSI than in single-user MIMO (SU-MIMO) should be reported in MU-MIMO.

In this context, the LTE-A standard has determined to separately design a final PMI as a long-term and/or wideband PMI, W1, and a short-term and/or subband PMI, W2.

For example, a long-term covariance matrix of channels expressed as Equation 8 may be used for hierarchical codebook transformation that configures one final PMI with W1 and W2.

$$W = \text{norm}(W1\,W2) \qquad [\text{Equation 8}]$$

In Equation 8, W2 is a short-term PMI, which is a codeword of a codebook reflecting short-term channel information, W is a codeword of a final codebook, and norm (A) is a matrix obtained by normalizing each column of matrix A to 1.

Conventionally, the codewords W1 and W2 are given as Equation 9.

$$W1(i) = \begin{bmatrix} X_i & 0 \\ 0 & X_i \end{bmatrix}, \qquad [\text{Equation 9}]$$

where $X_i$ is Nt/2 by M matrix.

$$W2(j) = \begin{bmatrix} \overset{r\,columns}{\overbrace{e_M^k \quad e_M^l \quad \cdots \quad e_M^m}} \\ \alpha_j e_M^k \quad \beta_j e_M^l \quad \cdots \quad \gamma_j e_M^m \end{bmatrix} \text{ (if rank} = r\text{),}$$

where $1 \le k,l,m \le M$ and k,l,m are integer.

In Equation 9, the codewords are designed so as to reflect correlation characteristics between established channels, if cross-polarized antennas are densely arranged, for example, the distance between adjacent antennas is equal to or less than half a signal wavelength. The cross-polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is quantized values of channels, it is necessary to design a codebook reflecting channel characteristics. For convenience of description, a rank-1 codeword designed in the above manner may be given as Equation 10.

$$W1(i) * W2(j) = \begin{bmatrix} X_i(k) \\ \alpha_j X_i(k) \end{bmatrix} \qquad [\text{Equation 10}]$$

In Equation 10, a codeword is expressed as an $N_T \times 1$ vector where NT is the number of Tx antennas and the codeword is composed of an upper vector $X_i(k)$ and a lower vector $\alpha_j X_i(k)$, representing the correlation characteristics of the horizontal and vertical antenna groups, respectively. $X_i(k)$ is expressed as a vector having the linear phase increment property, reflecting the correlation characteristics between antennas in each antenna group. For example, a discrete Fourier transform (DFT) matrix may be used for $X_i(k)$.

An advanced system such as an LTE-A system considers achievement of an additional multi-user diversity by the use of MU-MIMO. Due to the existence of interference channels between UEs multiplexed in an antenna domain in MU-MIMO, the accuracy of CSI may significantly affect interference with other multiplexed UEs as well as a UE that reports the CSI. Accordingly, more accurate CSI than in SU-MIMO should be reported in MU-MIMO.

In CoMP JT, because a plurality of eNBs transmits the same data to a specific UE through cooperation, the eNBs may be theoretically regarded as forming a MIMO system with antennas distributed geographically. That is, even when MU-MIMO is implemented in JT, highly accurate CSI is required to avoid interference between CoMP-scheduled UEs as in a single cell MU-MIMO operation. The same applies to CoMP CB. That is, to avoid interference with a serving cell caused by a neighbor cell, accurate CSI is needed. In general, a UE needs to report an additional CSI feedback in order to increase the accuracy of CSI feedback. The CSI feedback is transmitted on a PUCCH or a PUSCH to an eNB.

Meanwhile, a modulation scheme such as 256QAM can be considered to improve a downlink data transfer rate. In order to support 256QAM with respect to downlink data, link adaptation needs to be enabled together with the conventional modulation schemes. To this end, if such a new MCS (modulation and coding scheme) as 256QAM is added to the existing CQI index table similar to Table 1, a new CQI index table in excess of 4 bits needs to be formed. However, it may cause an increase in the payload size and such a change may also increase loads in various aspects including CSI feedback, DCI format and the like. Therefore, a method capable of applying a new modulation scheme while maintaining 4 bits of payload in Table 1 is required.

Thus, for a case that even if considering the new modulation scheme such as 256QAM, the use of a table indicated by 4 bits of the CQI index is still intended, the present invention proposes to form a new CQI index table as shown in Table 2. Referring to Table 2, some CQI indices i.e., CQI indices #13, #14 and #15 are mapped using 256QAM and lower CQI indices are mapped using MCS in order of decreasing spectral efficiency. As a result of that, a lowest CQI index #1 is the same as the existing CQI index #4 in Table 1 and other existing indices below it are not represented in the new CQI index table. Hereinafter, for the convenience of the explanation, the existing CQI index table as shown in Table 1 is referred to as CQI index table A and the new CQI index table as shown in Table 2 is referred to as CQI index table B.

TABLE 21

| CQI index | modulation | SINR | CR | SE |
|---|---|---|---|---|
| 1 | QPSK | −1.324 | 308 | 0.300781 | 0.6016 |
| 2 | QPSK | 0.568 | 449 | 0.438477 | 0.877 |
| 3 | QPSK | 2.46 | 602 | 0.587891 | 1.1758 |
| 4 | QPSK | 4.352 | 378 | 0.369141 | 1.4766 |
| 5 | 16QAM | 6.244 | 490 | 0.478516 | 1.9141 |
| 6 | 16QAM | 8.136 | 616 | 0.601563 | 2.4063 |
| 7 | 16QAM | 10.028 | 466 | 0.455078 | 2.7305 |
| 8 | 64QAM | 11.92 | 567 | 0.553711 | 3.3223 |
| 9 | 64QAM | 13.812 | 666 | 0.650391 | 3.9023 |
| 10 | 64QAM | 15.704 | 772 | 0.753906 | 4.5234 |
| 11 | 64QAM | 17.596 | 873 | 0.852539 | 5.1152 |
| 12 | 64QAM | 19.488 | 948 | 0.925781 | 5.5547 |
| 13 | 256QAM | 21.38 | 780 | 0.761719 | 6.09375 |
| 14 | 256QAM | 23.272 | 879 | 0.857937 | 6.863492 |
| 15 | 256QAM | 25.164 | 938 | 0.915675 | 7.325397 |

It should be understood that Table 2 is merely one example of a new CQI index table and a different form of CQI index table can be newly formed. In the present invention, it is described that when there are two different CQI index tables such as Table 1 and Table 2, which one of the two different CQI index tables is applied by a UE in order to calculate and report CQI. In particular, explained is a scheme for signaling which CQI index table is applied in case that the CQI index table A and CQI index table B exist. For the convenience of the explanation, it is assumed hereinafter that there are two types of CQI index tables. However, it is matter of course that the present invention can be extensively applied to a case that there are more than 3 types of CQI index tables.

<1$^{st}$ Embodiment—Periodic CSI (P-CSI) Reporting>

In case of periodic CSI reporting, at least one of the following schemes can be applied.

1. First of all, when there are the CQI index table A and CQI index table B, the use of RRC signaling may be considered to indicate which CQI index table applies. According to this scheme, it is semi-statically indicated which one of the CQI index table A and CQI index table B is used.

For instance, if the use of the CQI index table B is indicated through the RRC signaling, the CQI index table B is continuously used until when next RRC signaling is received. Such RRC signaling can be configured to be applied to each CSI process, to each periodic (i.e., PUCCH-based) CSI feedback configuration, or to all CSI processes commonly.

Although the above-mentioned scheme is simplest in terms of formation and implementation of the RRC signaling, RRC configuration latency equal to or greater than 100 ms may occur since it supports semi-static CQI index table switching only. Thus, the scheme has a disadvantage in that adaptation with respect to UE mobility and channel variation may be considerably delayed.

2. A scheme for enabling a specific CQI index table, which should be applied per specific CQI reporting instance, to vary based on TDM (time divisional multiplexing) depending on a pattern configured through RRC signaling may be considered. Such RRC signaling can be provided with respect to a specific CSI feedback configuration (and/or a specific CSI process). Depending on which type of signaling is used for the TDM-based variation, at least one among detail options in the following description may be applied. Irrespective of which one of the following detail options is applied, a UE can divide existing CQI reporting instances into 1$^{st}$ CQI reporting instances and 2$^{nd}$ CQI reporting instances. And, the UE calculates CQI, for example, using the CQI index table A for the 1$^{st}$ CQI reporting instances and the CQI index table B for the 2$^{nd}$ CQI reporting instances and then reports by mapping the calculated CQI.

Moreover, the calculation of corresponding CQI is performed according to a predetermined CQI definition. For instance, CQI to which latest reported RI and PMI will be applied is calculated and the only difference is that one of the CQI index table A and CQI index table B is used.

Through this scheme, the disadvantage of the scheme 1, i.e., the semi-static CQI index table switching can be compensated. For instance, if a CQI value determined through the CQI index table A is reported in one among four reports instead of using a CQI value determined through the CQI index table B at all times, flexibility is guaranteed in an eNB. Thus, the adaptation with respect to UE mobility and channel variation can be achieved.

More particularly, according to the above scheme, if a UE continuously reports only a lowest CQI index #1 in the CQI index table B as shown in Table 2 periodically, in the 1$^{st}$ CQI reporting instance in which reporting can be performed using the CQI index table A, the UE may not report a CQI index #4 (in the CQI index table A) with the same value as that of the CQI index #1 in Table 2 but report a CQI index #2 (in the CQI index table A) lower than the CQI index #4. In this case, a network may perform scheduling by considering CQI feedback of the UE as the CQI index #2 in Table 1. Moreover, the network may perform an operation of adjusting a ratio of the TDM-based CQI index table switching through an RRC reconfiguration in consideration of the frequency of the event.

(1) Detail Option A

RRC signaling may be defined to provide additional parameters including reporting period (N_pd'), offset (N_offset') and the like for 2$^{nd}$ CQI reporting, i.e., CQI reporting using the CQI index table B separated from existing parameters such as reporting period (N_pd), offset (N_offset) and the like for indicating candidates of the 1$^{st}$ CQI reporting instance. In this case, the N_pd' may be limited to be a specific positive integer multiple of the N_pd. On the other hand, offsets may be configured independently without limitation. For instance, the offset of the 1$^{st}$ CQI reporting instance may be configured equal to that of the 2$^{nd}$ CQI reporting instance. In other words, the 2$^{nd}$ CQI reporting may be limited to be indicated from among the 1$^{st}$ CQI reporting instances at all times and N_offset' may be limited to be set to a value satisfying such a inclusion relation.

In addition, a UE is configured to calculate and report CQI by applying a previously promised specific CQI index table (i.e., CQI index table B) to the instances in which the 2$^{nd}$ CQI reporting is instructed and the UE is configured to calculate and report CQI by applying a previously promised different specific CQI index table (i.e., CQI index table A) to the 1$^{st}$ CQI reporting instances in which the 2$^{nd}$ CQI reporting is not instructed.

(2) Detail Option B

It is possible to implement a scheme for indicating which instance corresponds to the 1$^{st}$ CQI reporting instance having the CQI index table A applied thereto and which instance corresponds to the 2$^{nd}$ CQI reporting instance having the CQI index table B applied thereto through a specific unit of bitmap information with respect to all the existing CQI reporting instances, which are determined through the existing parameters such as the reporting period (N_pd) and the offset (N_offset) and the like. In this case, an instance indicated by the bitmap set to 0 may correspond to the 1$^{st}$ CQI reporting instance and an instance indicated by the bitmap set to 1 may correspond to the 2$^{nd}$ CQI reporting instance and vice versa.

Moreover, such a bitmap may be defined to be configured, for example, in an interval between two adjacent RI reporting instances. Additionally or alternatively, an interval between bits on the bitmap may correspond to the period (N_pd) of the feedback reporting. For instance, a starting point of the bitmap may be defined to apply from an initial CQI reporting instance existing after a specific RI reporting instance. And, if a next RI reporting instance appears, it may be defined to reapply from an initial bit of the bitmap with respect to an initial CQI reporting instance existing after the next RI reporting instance.

In the above-mentioned operation, if a UE initially performs CSI feedback after the corresponding CSI feedback is configured through RRC signaling, there may be ambiguity i.e., no latest RI reporting instance may exist. In this case, it may be defined and regulated that a specific CQI index table (e.g., CQI index table A) is applied as default.

Alternatively, the bitmap may be defined in the form of a subframe bitmap by unit (e.g., unit of 40-ms interval) determined as absolute time relation based on a specific reference time such as a frame number and the like.

(3) Detail Option C

It may be previously defined in the standard which pattern is used for performing CQI index table switching in a manner of interconnecting specific RRC parameters (e.g., N_pd, N_offset, subband reporting related parameters, etc.) related to CQI reporting. Alternatively, it is possible to implement a scheme for configuring/reconfiguring such a pattern through RRC signaling.

As an example of changing a CQI index table switching period in accordance with a reporting period, a ratio of the CQI index table switching can be interconnected with N_pd or other parameters in advance. In particular, for example, in case of N_pd=2, a CQI index table is switched in each CQI reporting instance (in this case, the reference time may be set with reference to a frame number or a latest RI reporting instance). And, in case of N_pd=5, a CQI index table is switched after 2 CQI reporting instances. Accordingly, It is possible to implement a scheme that does not need such a direct RRC configuration for the CQI index table switching as the detail option A or the detail option B.

In this case, CQI dropping may occur. A scheme for continuously maintaining an operation of switching the CQI index table irrespective of the occurrence of the CQI dropping can be implemented. In particular, considering that a CQI index table switching pattern can be validly applied to a dropped CQI reporting instance, the pattern is continuously applied. Alternatively, in the case of the CQI dropping, the operation of switching the CQI index table can be skipped. In other words, the CQI index table switching pattern may be skipped in the dropped CQI reporting instance and the pattern can be applied to a next valid CQI reporting instance.

(4) Detail Option D

There may be 1 bit of specific indicator such as MTI (MCS type indicator) in a specific CSI feedback configuration. It may be defined/configured that in case of MTI set to 0, the CQI index table A is applied and in case of MTI set to 1, the CQI index table B is applied. In particular, when performing CSI feedback, a UE reports which table is referred to in the reported CQI by feeding back corresponding MTI together through the CQI reporting instance.

It can be defined that the MTI field is joint-encoded with RI or other long-term feedback components (e.g., the above-mentioned W1). Moreover, the MTI may be set to be reported through a separate feedback instance. Furthermore, if a UE does not support MIMO, there may be no RI and/or PMI reporting. In this case, a separate resource can be configured in order for the UE to feed back the MTI directly.

<2$^{nd}$ Embodiment—Aperiodic CSI (A-CSI) Reporting>

In case of aperiodic CSI reporting, it can be dynamically signaled which one of the CQI index table A and CQI index table B is applied by a UE to determine a CQI value according to at least one from the group consisting of the following schemes and to perform the aperiodic (i.e., PUSCH-based) CSI reporting.

1) CQI index tables can be classified per specific DCI format. For instance, if A-CSI triggering is detected in DCI format 0, a specific CQI index table (i.e., the CQI index table A) may be defined/configured to be used at all times. And, if the A-CSI triggering is detected in a different uplink transmission related DCI format (e.g., DCI format 4), a specific CQI index table (i.e., CQI index table B) may be defined/configured to be used at all times.

2) CQI index tables can be classified per specific search space. For instance, if the A-CSI triggering is detected in CSS (common search space), a specific CQI index table (i.e., CQI index table A) may be defined/configured to be used at all times. And, if the A-CSI triggering is detected in USS (UE-specific search space), a specific CQI index table (i.e., CQI index table B) may be defined/configured to be used at all times.

3) CQI index tables can be classified depending on which control channel is used for transmission of DCI having the A-CSI triggering detected therein. For instance, if the A-CSI triggering is detected in DCI received though PDCCH, a specific CQI index table (i.e., the CQI index table A) may be defined/configured to be used at all times. And, if the A-CSI triggering is detected in DCI received through EPDCCH (enhanced PDCCH), a specific CQI index table (i.e., CQI index table B) may be defined/configured to be used at all times. In this case, the EPDCCH is the control channel transmitted by being mapped to the same region as that used for PDSCH mapping.

4) CQI index tables can be classified depending on which specific subframe type is used for transmission of the DCI having the corresponding A-CSI triggering detected therein. For instance, the A-CSI triggering is detected in a non-MBSFN subframe, a specific CQI index table (i.e., the CQI index table A) may be defined/configured to be used at all times. And, if the A-CSI triggering is detected in an MBSFN subframe, a specific CQI index table (i.e., CQI index table B) may be defined/configured to be used at all times.

Alternatively, CQI index tables can be classified based on specific subframe set information provided through a high layer signal. For instance, if the A-CSI triggering is detected in a subframe set A, a specific CQI index table (i.e., the CQI index table A) may be defined/configured to be used at all times. And, if the A-CSI triggering is detected in a subframe set B, a specific CQI index table (i.e., CQI index table B) may be defined/configured to be used at all times.

The following schemes can be applied to an embodiment related to subframe set configuration information.

a) The CQI index table may be applied by being interconnected with subframe sets $c_{CSI,0}$ and $c_{CSI,1}$ configured for resource-restricted CSI measurement. In this case, a specific subframe set ($c_{CSI,0}$) may be the subframe set to which ABS (almost blank subframe) or r-ABS (reduced ABS) is applied by a specific different cell. It may be preferable that the new CQI index table (i.e., CQI index table B) is applied to the subframe set having the ABS or r-ABS applied thereto by the different cell. In case that a carrier aggregation scheme is applied, such subframe set information may be defined/configured so that subframe set information defined in PCell (primary-cell) is also applied to SCell (secondary-cell). Alternatively, subframe set information in each of the PCell and SCell may be configured separately and independently.

b) In the system in which a usage of a subframe can be dynamically changed in each subframe, different CQI index tables may be applied depending on whether a subframe set is a static subframe set to which dynamic resource usage change cannot be applied (it may be interconnected with $c_{CSI,0}$ in the aforementioned scheme a)) or a dynamic subframe set to which the dynamic resource usage change can be applied (it may be interconnected with $c_{CSI,1}$ in the aforementioned scheme a)). In this case, it is preferred to apply the CQI index table (i.e., CQI index table B) proposed in the present invention to the static subframe set. For reference, the static subframe set may be defined as a set of downlink subframes indicated through system information. Similarly, in case that the carrier aggregation scheme is applied, such subframe set information may be defined/configured so that subframe set information defined in PCell (primary-cell) is also applied to SCell (secondary-cell).

Alternatively, subframe set information in each of the PCell and SCell may be configured separately and independently.

5) Alternatively, a CQI index table applied to each state that can be indicated by a CQI triggering field in the DCI having the corresponding A-CSI triggering detected therein may be defined in advance. In particular, it may be previously defined in an RRC configuration which CQI index table is applied to each state in the corresponding CQI triggering field.

6) Lastly, through a new field or reusing an existing filed, it can be explicitly indicated which CQI index table will be used. In particular, in case of DCI format 0, there are zero padding bits for matching a payload size with DCI format 1A and some of the padding bits can be used as a CQI index table indicator.

The above proposed schemes are mainly described centering on the scheme for signaling which CQI index table among specific CQI index tables assumed by a UE is applied. Moreover, when a base station performs scheduling on a UE, two or more CQI index tables are defined to interpret 5 bits of MCS/RV field existing in DCI corresponding to relevant downlink grant. The proposed schemes can be similarly applied to a scheme for indicating which CQI index table is applied by a UE to perform decoding on corresponding PDSCH. For instance, when CQI index tables are classified per DCI format according to the proposed schemes related to the aperiodic CSI, in case of DCI format 1A, a $1^{st}$ MCS/RV CQI index table may be configured to be applied. And, in case of other formats, a $2^{nd}$ MCS/RV CQI index table may be configured to be applied. Moreover, activation of the above operation can be indicated through RRC signaling.

In addition, the above proposed signaling schemes can be not only used for different CQI index tables but also similarly applied to a switching scheme for calculating CSI based on a hypothesis related to a certain CSI feedback for each of hypotheses related to different CSI feedback and then feeding back the calculated CSI.

Figure 8:
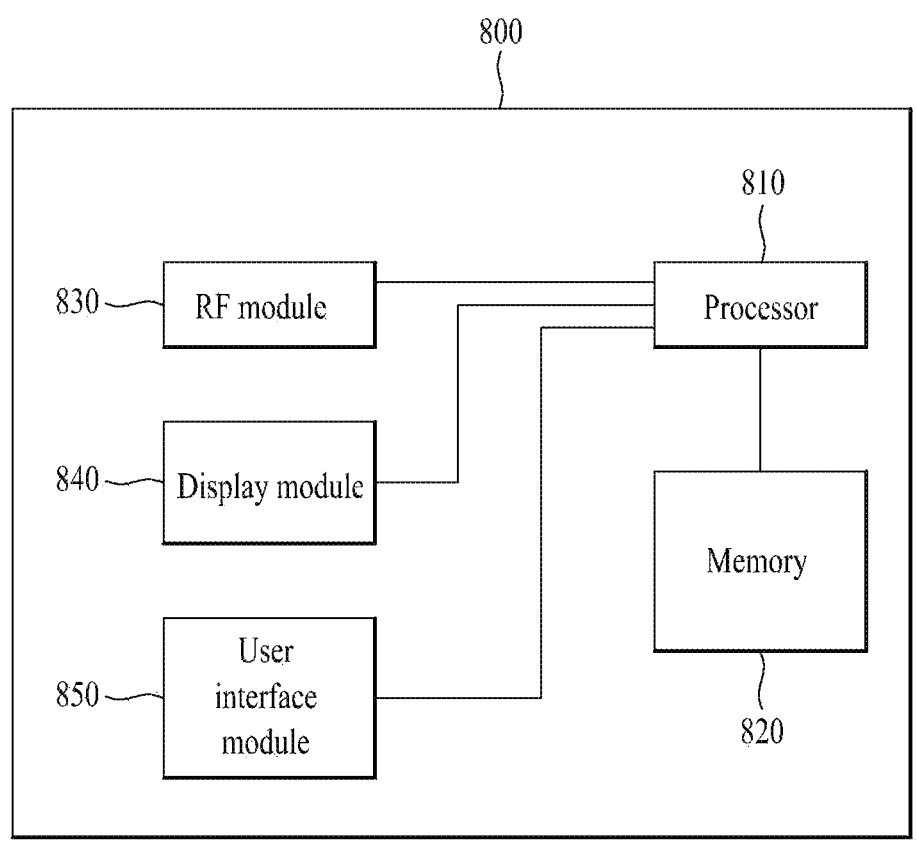
FIG. 8 is a block diagram of a communication apparatus according to an embodiment of the present invention.

FIG. 8 is a block diagram for an example of a communication device according to one embodiment of the present invention.

Referring to FIG. 8, a communication device 800 may include a processor 810, a memory 820, an RF module 830, a display module 840, and a user interface module 850.

Since the communication device 800 is depicted for clarity of description, prescribed module(s) may be omitted in part. The communication device 800 may further include necessary module(s). And, a prescribed module of the communication device 800 may be divided into subdivided modules. A processor 810 is configured to perform an operation according to the embodiments of the present invention illustrated with reference to drawings. In particular, the detailed operation of the processor 810 may refer to the former contents described with reference to FIG. 1 to FIG. 7.

The memory 820 is connected with the processor 810 and stores an operating system, applications, program codes, data, and the like. The RF module 830 is connected with the processor 810 and then performs a function of converting a baseband signal to a radio signal or a function of converting a radio signal to a baseband signal. To this end, the RF module 830 performs an analog conversion, amplification, a filtering, and a frequency up conversion, or performs processes inverse to the former processes. The display module 840 is connected with the processor 810 and displays various kinds of informations. And, the display module 840 can be implemented using such a well-known component as an LCD (liquid crystal display), an LED (light emitting diode), an OLED (organic light emitting diode) display and the like, by which the present invention may be non-limited. The user interface module 850 is connected with the processor 810 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method for feeding back a channel quality indicator in a wireless communication system and apparatus therefor are mainly described with reference to the examples of applying to 3GPP LTE system in the foregoing description, the present invention is applicable to various kinds of wireless communication systems as well as to the 3GPP LTE system.

What is claimed is:

1. A method of reporting a channel quality indicator (CQI), which is reported by a user equipment to a base station in a wireless communication system, the method comprising:
   configuring a CQI index table switching pattern for periodic channel state information (CSI) reporting, based on a CQI reporting period;
   calculating a precoding matrix index and a rank indicator; and
   reporting a CQI index by selecting the CQI index from one index table of a $1^{st}$ CQI index table and a $2^{nd}$ CQI index table on an assumption that the precoding matrix index and the rank indicator are applied,
   wherein the one index table is determined according to the CQI index table switching pattern,
   wherein the $1^{st}$ CQI index table and the $2^{nd}$ CQI index table indicate a modulation order and a coding rate indicated by the CQI index,
   wherein the $2^{nd}$ CQI index table supports a modulation order higher than that of the $1^{st}$ CQI index table, and
   wherein, when a specific CQI reporting instance is dropped, the CQI index table switching pattern is not applied for the specific CQI reporting instance.

2. The method of claim 1, further comprising:
   receiving triggering information of aperiodic CSI reporting from the base station, wherein the one index table is determined according to whether a subframe in which the triggering information is received is MBSFN, multicast-broadcast single-frequency network, subframe or non-MBSFN subframe, when the CQI is reported aperiodically.

3. A user equipment in a wireless communication system, the user equipment comprising:
   a transceiver;
   a processor, coupled to the transceiver, that:
   configures a CQI index table switching pattern for periodic channel state information (CSI) reporting, based on a CQI reporting period,
   calculates a precoding matrix index and a rank indicator based on a signal received from the base station, and
   controls the transceiver to report a CQI (channel quality indicator) index by selecting the CQI index from one index table of a $1^{st}$ CQI index table and a $2^{nd}$ CQI index table on an assumption that the precoding matrix index and the rank indicator are applied, wherein the one index table is determined according to the CQI index table switching pattern,
   wherein the $1^{st}$ CQI index table and the $2^{nd}$ CQI index table indicate a modulation order and a coding rate indicated by the CQI index,
   wherein the $2^{nd}$ CQI index table supports a modulation order higher than that of the $1^{st}$ CQI index table, and
   wherein, when a specific CQI reporting instance is dropped, the CQI index table switching pattern is not applied for the specific CQI reporting instance.

4. The user equipment of claim 3, wherein the processor further:
   controls the transceiver to receive triggering information of aperiodic CSI reporting from the base station, wherein the one index table is determined according to whether a subframe in which the triggering information is received is MBSFN, multicast-broadcast single-frequency network, subframe or non-MBSFN subframe, when the CQI is reported aperiodically.

* * * * *